(12) United States Patent
Ishimaru

(10) Patent No.: US 6,568,864 B1
(45) Date of Patent: May 27, 2003

(54) SEMICONDUCTOR LASER MODULE AND PROCESS FOR MANUFACTURING THE SAME

(75) Inventor: Tomohisa Ishimaru, Ichihara (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/704,603

(22) Filed: Nov. 3, 2000

(30) Foreign Application Priority Data

Nov. 5, 1999 (JP) ............................. 11-315237

(51) Int. Cl.[7] ................................................ G02B 6/36
(52) U.S. Cl. ...................................................... 385/93
(58) Field of Search ............................. 385/93, 92, 94, 385/14, 31, 33; 372/36

(56) References Cited

U.S. PATENT DOCUMENTS

| 4,926,430 A | * | 5/1990 | Isono | 372/33 |
| 5,381,499 A | * | 1/1995 | Takenaka et al. | 385/93 |
| 5,611,006 A | * | 3/1997 | Tabuchi | 385/14 |
| 6,174,092 B1 | * | 1/2001 | Siala | 385/91 |

FOREIGN PATENT DOCUMENTS

JP  10-039174  * 2/1998

* cited by examiner

*Primary Examiner*—Robert H. Kim
*Assistant Examiner*—Chih-Cheng Kao
(74) *Attorney, Agent, or Firm*—Oblon, Spivak, McClelland, Maier & Neustadt

(57) ABSTRACT

A semiconductor laser module for coupling optically light radiated from a semiconductor laser device to an optical fiber using a lens and an optical isolator and a process for manufacturing the same. A lens holder for holding the lens and the optical isolator are secured on a single and common securing member.

16 Claims, 3 Drawing Sheets

SEMICONDUCTOR LASER MODULE AND PROCESS FOR MANUFACTURING THE SAME

BACKGROUND OF THE INVENTION

1. Field of the Invention

The present invention relates to a semiconductor laser module and a process for manufacturing the same.

2. Description of the Related Art

Semiconductor laser modules are provided with a number of components including a semiconductor laser device, a lens, a lens holder, a photodiode for monitoring output from the semiconductor laser device, a temperature controlling element and an optical isolator as disclosed, for example, in Japanese Unexamined Patent Publication (Kokai) No. Hei 10-39174. In this semiconductor laser module, light output from the semiconductor laser device is converged by the lens into a collimated beam, which is then led to an optical fiber through the optical isolator, and the beam wave-guided through the optical fiber is used for desired applications.

In such a semiconductor laser module, there are many parts, as described above, comprising a light path from the semiconductor laser device to the optical fiber, so that misalignment of optical axes is possible, particularly between the lens and the optical isolator. If such misalignment occurs in the semiconductor laser module, the light output through the lens is hampered by the optical isolator, resulting in reduced optical coupling efficiency. In addition, the semiconductor laser modules described above are expensive, since they are composed of a large number of expensive components.

SUMMARY OF THE INVENTION

It is an objective of the present invention to provide a semiconductor laser module which can not only enhance the effect of optical coupling by reducing misalignment of the optical axes between the lens and the optical isolator but also realize cost saving, and a process for manufacturing the same.

In order to attain the above objective, the semiconductor laser module, according to the present invention, for optically coupling light radiated from a semiconductor laser device to an optical fiber using a lens and an optical isolator has a constitution in which a lens holder for holding the lens is secured together with the optical isolator on a single and common securing member.

Preferably, the securing member is a channel element having a bottom plate and a pair of side walls formed on each side thereof.

Further, each side wall is preferably designed to have a length orthogonal to optical axes of the lens held by the lens holder and of the optical isolator such that the optical axis of the lens is aligned with that of the optical isolator.

Preferably, the optical isolator has a columnar shape.

Furthermore, the securing member is preferably designed to satisfy the following relationships:

$$W1 < D \text{ and } H1 > D/2 - (D^2/4 - W1^2/4)^{1/2}$$

wherein W1 represents the width W1 between two side walls; H1 represents the height of the side wall; and D represents the diameter of the optical isolator.

Meanwhile, in the case where the width between the two side walls of the securing member is substantially equal to or slightly greater than the diameter of the optical isolator, the optical isolator is disposed on the base plate between these two side walls and is welded thereto by means of YAG laser from the outside to pierce the side walls.

Further, the height of each side wall of the securing member is preferably changed between the portion where the lens holder is secured and the portion where the optical isolator is secured.

Furthermore, the lens holder is preferably secured on the securing member at a height substantially equal to that of the optical axis of the lens held by the lens holder.

Preferably, the lens holder and the optical isolator are preferably welded to the securing member.

Further, the lens holder and the optical isolator are preferably secured on tops of the side walls of the securing member.

Furthermore, the optical isolator is preferably welded to the securing member from the outside to pierce the side walls.

Preferably, the securing member is fixed on a base.

It is also preferred that the base is fixed on a temperature controlling element.

Meanwhile, in order to attain the above objective, the process for manufacturing a semiconductor laser module, according to the present invention, for optically coupling light radiated from a semiconductor laser device to an optical fiber using a lens and an optical isolator has a constitution including a step of securing a lens holder for holding the lens and the optical isolator on a single and common securing member.

These and other objects, aspects and advantages of the invention will become more apparent from the following detailed description, taken in conjunction with the accompanying drawings.

DETAILED DESCRIPTION OF THE PREFERRED EMBODIMENTS

A semiconductor laser module and a process for manufacturing the same according to a first embodiment of the present invention will be described specifically referring to FIGS. 1 to 5.

Figure 1:
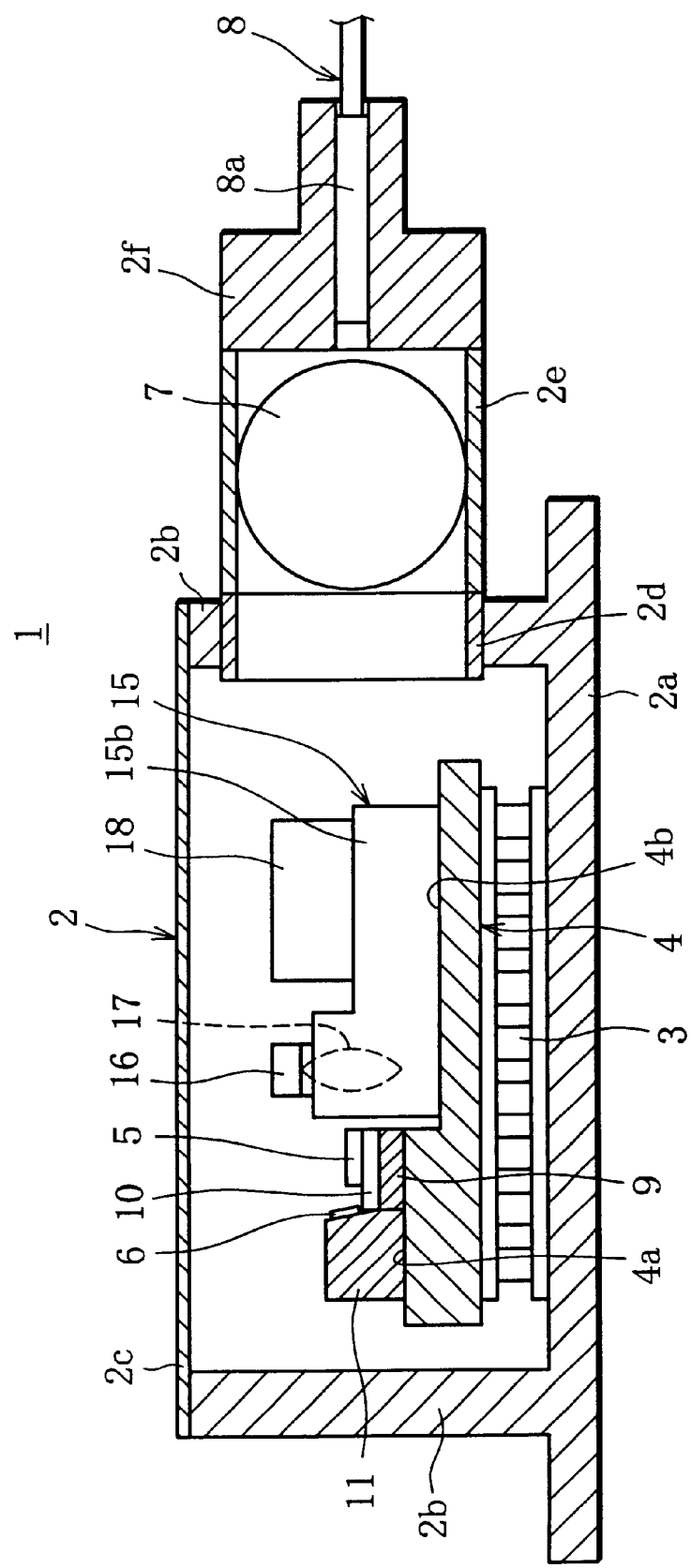
FIG. 1 is a cross-sectional front view showing the semiconductor laser module and a process for manufacturing the same, according to one embodiment of the present invention.

The semiconductor laser module 1 contains a package 2, a temperature controlling element 3, a base 4, a semiconductor laser device 5, a photodiode 6, a securing member 15, a first lens 17 and an optical isolator 18, as shown in FIG. 1.

As shown in FIG. 1, the package 2 contains the temperature controlling element 3, the base 4, the semiconductor laser device 5, the photodiode 6, the securing member 15, the first lens 17, the optical isolator 18, etc. The package 2 has a bottom plate 2a, a peripheral wall 2b and a cover 2c to be fitted to the top of the peripheral wall 2b. Further, the package 2 has a flange 2d formed on the peripheral wall 2b and a second lens holder 2e welded to the end face of the flange 2d by means of YAG laser. A spherical lens 7 is inserted as a second lens into the second lens holder 2e, and a fiber sleeve 2f is attached to the outer end of the holder 2e. A ferrule 8a connected to the proximal end of an optical fiber 8 is welded to the fiber sleeve 2f by means of YAG laser.

The temperature controlling element 3 is a peltier element which is attached to the bottom plate 2a, as shown in FIG. 1, so as to control cooling of the heat generated during operation of the semiconductor laser device 5 down to a predetermined temperature, and the base 4 is placed on the temperature controlling element 3. The temperature controlling element 3 controls the temperature of the semiconductor laser device 5 by adjusting the electric current value depending on the temperature measured by a thermistor (not shown) located in the vicinity of the semiconductor laser device 5.

Figure 2:
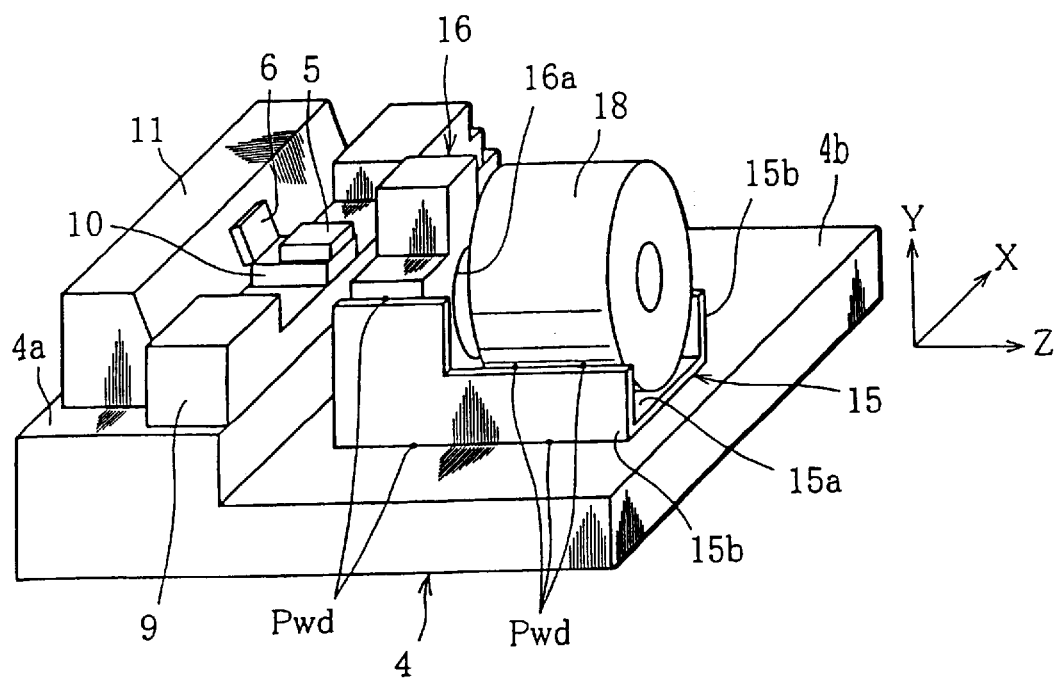
FIG. 2 is a perspective view showing major components to be disposed, together with the lens holder and the optical isolator secured on the securing member, in a package of the semiconductor laser module shown in FIG. 1.

The base 4 is a plate-shaped element, which is designed to be thick and thin at one end and at the other end respectively with respect to the longitudinal direction (in the direction of Z axis in FIG. 2) to form a first mounting table 4a and a second mounting table 4b, as shown in FIG. 2. That is, the first mounting table 4a is designed to be thicker than the second mounting table 4b. The semiconductor laser device 5 is mounted on the first mounting table 4a through a first carrier 9 and a heat sink 10. A second carrier 11 is also mounted on the first mounting table 4a adjacent to the first carrier 9, and also the photodiode 6 is attached to the second carrier 11 to oppose the semiconductor laser device 5. Meanwhile, the securing member 15 is mounted on the second mounting table 4b and is welded thereto by means of YAG laser at proper welding points Pwd.

Here, the first carrier 9 and the second carrier 11 are soldered to the base 4, while the heat sink 10 and the semiconductor laser device 5 are soldered to the first carrier 9 and to the heat sink 10 respectively.

The semiconductor laser device 5 radiates, from the front end face thereof, a predetermined wavelength of laser beam to the first lens 17 and, from the rear end face thereof, monitor light to the photodiode 6. Here, the semiconductor laser device 5 is positioned, for example, such that the difference between the height of the active layer and that of the optical axis of the first lens 17 is within several $\mu$m.

The photodiode 6 is attached to the slanted front face of the second carrier 11, as shown in FIG. 2 and monitors the monitor light radiated from the rear end face of the semiconductor laser device 5.

The securing member 15 is a channel-shaped element containing a bottom plate 15a and a pair of side walls 15b, for positioning a lens holder 16 and the optical isolator 18 in the direction of X axis in FIG. 2, formed on each side of the bottom plate 15a, and has the lens holder 16 and the optical isolator 18 secured directly thereon, as shown in FIG. 2. Here, the height (length in the direction of Y axis in FIG. 2) of each side wall 15b is suitably changed between the portion where the lens holder 16 is secured and the portion where the optical isolator 18 is secured such that the optical axis of the first lens 17 (see FIG. 1) held by the lens holder 16 is aligned with that of the optical isolator 18. Further, in the securing member 15, the portion of each side wall 15b for securing the lens holder 16 is allowed to have substantially the same height, for example, as the height of the center of the first lens 17. Thus, the lens holder 16 can be welded to the securing member 15 at welding points Pwd, which are substantially of the same height as the center of the first lens 17. Therefore, even if a minor displacement of the lens holder 16 occurs in the pivoting direction thereof during the operation of welding it to the securing member 15, the first lens 17 can be prevented from dislocating from the target position thereof. As described above, since the height of each side wall 15b of the securing member 15 is changed suitably between the portion where the lens holder 16 is secured and the portion where the optical isolator 18 is secured, loss of optical coupling efficiency attributed to misalignment of optical axes between the first lens 17 and the optical isolator 18 can be further reduced.

The first lens 17 is a collimator lens, which converts the light radiated from the semiconductor laser device 5 into a collimated beam, and is fixed with a low-melting glass in a fitting hole 16a of the lens holder 16 made of a metal such as stainless steel.

The optical isolator 18, which has a columnar appearance, is fixed to the pair of side walls 15b of the securing member 15 and is located adjacent to the lens holder 16, as shown in FIG. 2.

Here, the lens holder 16 and the optical isolator 18 are welded to the side walls 15b by means of YAG laser or the like at proper welding points (securing positions) Pwd.

The semiconductor laser module 1 having the constitution as described above can be manufactured according to the process to be described below.

First, the first carrier 9 is soldered to the first mounting table 4a of the base 4. The semiconductor laser device 5 is soldered beforehand to the first carrier 9 through the heat sink 10, and the first carrier 9 is connected electrically to the semiconductor laser device 5 by wire bonding.

Next, the second carrier 11 is soldered to the first mounting table 4a. A photodiode 6 is soldered beforehand to the second carrier 11, and they are connected electrically to each other by wire bonding.

Subsequently, the position of the lens holder 16 fitted between the side walls 15b of the securing member 15 is as such adjusted such that the light output through the first lens 17 be converged into a collimated beam.

The securing member 15 is then welded by means of YAG laser to the base 4, as well as, to the lens holder 16 at proper welding points Pwd respectively, as shown in FIG. 2.

Next, the optical isolator 18 is mounted on the second mounting table 4b adjacent to the lens holder 16 and between two side walls 15b, followed as such by aligning of the optical axes. The thus aligned optical isolator 18 is likewise welded by means of YAG laser to the side walls 15b at proper welding points Pwd. Contrariwise, the optical isolator 18 may be placed between the side walls 15b after aligning of the optical axes.

Subsequently, the temperature controlling element 3 is attached to the bottom plate 2a of the package 2, and lead wires (not shown) are soldered onto the package 2.

The base 4 is then fixed on the temperature controlling element 3, and after adjustment such that the light radiated from the semiconductor laser device 5 is aligned with the center of the flange 2d, the base 4 is soldered to the temperature controlling element 3. Next, electrodes of the first carrier 9 and of the second carrier 11 are connected (wire-bonded) to the lead wires (not shown) of the package 2 with gold wire (not shown).

Subsequently, the cover 2a is applied to the top of the peripheral wall 2b, and the second lens holder 2e is welded by means of YAG laser to the end face of the flange 2d.

The fiber sleeve 2f and the ferrule 8a are welded onto the end of the second lens holder 2e by means of YAG laser to complete assembly of the semiconductor laser module 1.

As described above, in the semiconductor laser module 1, the lens holder 16 holding the first lens 17 is secured onto the common securing member 15 together with the optical isolator 18. Therefore, misalignment of optical axes between the first lens 17 and the optical isolator 18 can be prevented from occurring in the semiconductor laser module 1, thus increasing coupling efficiency of the light radiated from the semiconductor laser device 5 to the optical fiber 8. In addition, in the semiconductor laser module 1, the lens holder 16 for holding the first lens 17 and the optical isolator 18 are secured on a single and common securing member 15, requiring no extra securing member. This leads to reduction in the number of components of the semiconductor laser module 1, in turn, to cost saving.

Modifications of the securing member in the semiconductor laser module 1 will now be described below. It should be noted here that the same components as in the semiconductor laser module 1 are affixed with the same reference numbers respectively, while those parts corresponding to the securing member 15 are affixed with different reference numbers respectively, so as to avoid redundant description.

Figure 3:
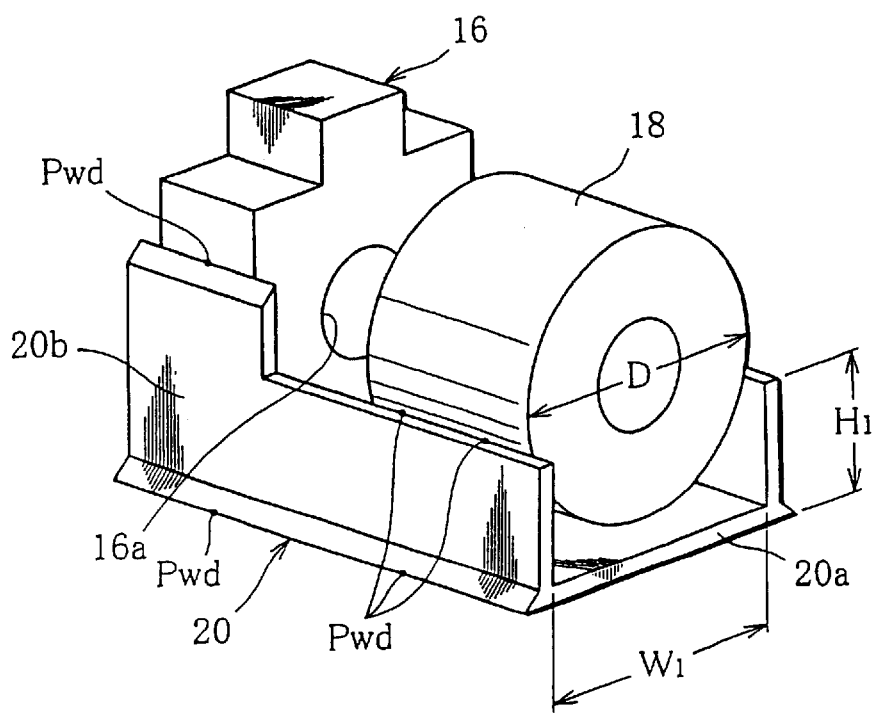
FIG. 3 is a perspective view showing a modification of the securing member.

For example, in a securing member 20 shown in FIG. 3, the height H1 of the side walls 20b for securing the optical isolator 18 and the width W1 between these two side walls 20b are preferably designed to establish the following relationship:

$$W1<D, H1>D/2-(D^2/4-W1^2/4)^{1/2}$$

(wherein D represents the diameter of the optical isolator 18), so that the optical isolator 18 is not brought into contact with the bottom plate 20a.

It should be noted here that the optical isolator 18 can be secured stably on the two side walls 20b, if each side wall 20b is formed to have a straight upper end parallel to the longitudinal direction.

Figure 4:
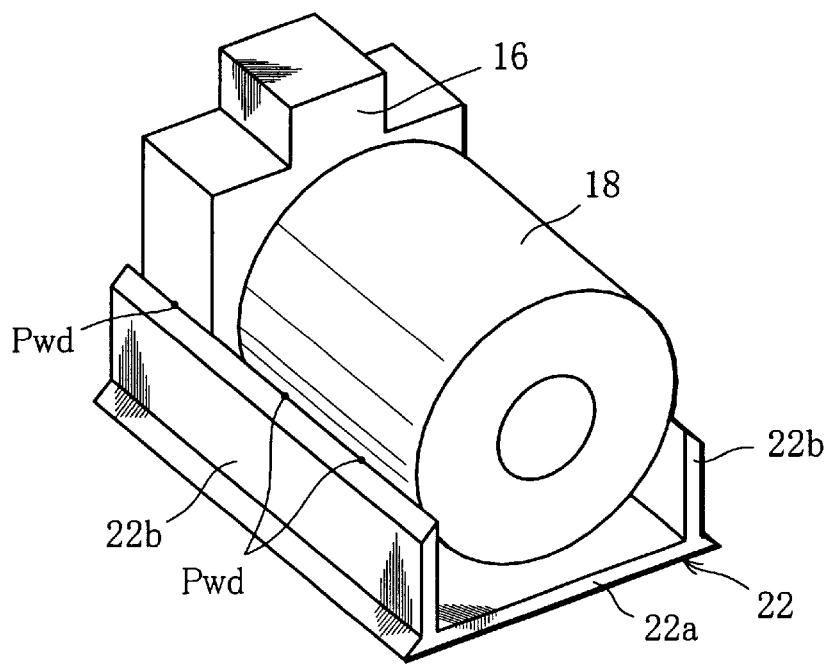
FIG. 4 is a perspective view showing another modification of the securing member.

Like in a securing member 22 as shown in FIG. 4, if each side wall 22b is designed to have a uniform height in the longitudinal direction, this leads to cost saving, since the structure is simplified compared with the securing member 15 shown in FIG. 2 and the securing member 20 shown in FIG. 3, contributing to further cost saving in manufacturing semiconductor laser modules 1.

Figure 5:
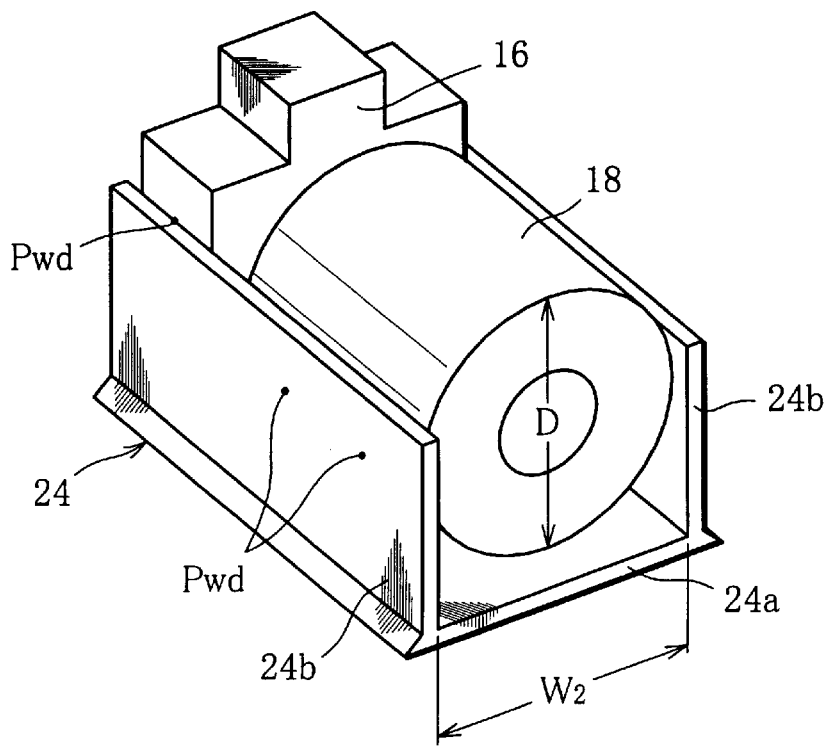
FIG. 5 is a perspective view showing a further modification of the securing member.

Further, like in a securing member 24 as shown in FIG. 5, if the width W2 between two side walls 24b is equal to or slightly greater than the diameter D of the optical isolator 18 to establish the relationship of W2≈D, the optical isolator 18 is disposed on the bottom plate 24a between these two side walls 24b, and the optical isolator 18 is welded to the side walls 24b from the outside to pierce them by means of YAG laser at proper welding points Pwd. Here, aligning of the optical axes between the optical isolator 18 and the first lens 17 can be achieved in the vertical direction by positioning the isolator 18 vertically with respect to the securing member 24. This further facilitates aligning of the optical axis of the first lens 17 (not shown) held by the lens holder 16 with that of the optical isolator 18. Thus, the use of the securing member 24 in the semiconductor laser module 1 further enhances coupling efficiency of the light radiated from the semiconductor laser device 5 to the optical fiber 8.

What is claimed is:

1. A semiconductor laser module for optically coupling light radiated from a semiconductor laser device to an optical fiber using a lens and an optical isolator, said module comprising:

a lens holder for holding the lens; and a single and common securing member configured to attach the lens holder together with the optical isolator thereon, the securing member comprising a channel element having a bottom plate and a pair of side walls formed on each side of the bottom plate, the pair of side walls positioning the lens holder and the optical isolator relative to each other, wherein each side wall is configured to have a length orthogonal to an optical axis of the lens and orthogonal to an optical axis of the optical isolator such that the optical axis of the lens is aligned with the optical axis of the optical isolator.

2. The semiconductor laser module according to claim 1, wherein the optical isolator has a columnar shape.

3. The semiconductor laser module according to claim 2, wherein the securing member is configured to satisfy:

$$W1<D \text{ and } H1>D/2-(D^2/4-W1^2/4)^{1/2},$$

wherein W1 represents a width between the pair of side walls; H1 represents a height of the pair of side walls; and D represents a diameter of the optical isolator.

4. The semiconductor laser module according to claim 1, wherein the width between the pair of side walls is not smaller than a diameter of the optical isolator, the optical isolator is disposed on the bottom plate between the pair of side walls and is attached thereto.

5. The semiconductor laser module according to claim 1, wherein the height of each side wall is different between the portion where the lens holder is secured and the portion where the optical isolator is secured.

6. The semiconductor laser module according to claim 1, wherein the lens holder is attached on the securing member at a height equal to a height of the optical axis of the lens held by the lens holder.

7. The semiconductor laser module according to claim 1, wherein the lens holder is attached to the securing member.

8. The semiconductor laser module according to claim 1, wherein the optical isolator is attached to the securing member.

9. The semiconductor laser module according to claim 1, wherein the lens holder is attached on top of the pair of side walls.

10. The semiconductor laser module according to claim 1, wherein the optical isolator is attached on top of the pair of side walls.

11. The semiconductor laser module according to claim 1, further comprising:

means for attaching the optical isolator to the securing member from the outside by piercing the pair of side walls.

12. The semiconductor laser module according to claim 1, wherein the securing member is fixed on a base.

13. The semiconductor laser module according to claim 12, wherein the base is fixed on a temperature controlling element.

14. A process for manufacturing a semiconductor laser module for optically coupling light radiated from a semiconductor laser device to an optical fiber using a lens and an optical isolator, comprising:

securing a lens holder for holding the lens and the optical isolator on a single and common securing member, the securing member comprising a channel element having a bottom plate and a pair of side walls formed on each side of the bottom plate, the pair of side walls positioning the lens holder and the optical isolator relative to each other, wherein each side wall is configured to have a length orthogonal to an optical axis of the lens and orthogonal to an optical axis of the optical isolator such that the optical axis of the lens is aligned with the optical axis of the optical isolator.

15. A semiconductor laser module for optically coupling light radiated from a semiconductor laser device to an optical fiber using a lens and an optical isolator, said module comprising:

a lens holder for holding the lens; and a single and common securing member configured to attach the lens holder together with the optical isolator thereon, the securing member comprising a channel element having a bottom plate and a pair of side walls formed on each side of the bottom plate, the pair of side walls positioning the lens holder and the optical isolator relative to each other, wherein the optical isolator has a columnar shape, and the securing member is configured to satisfy:

$W1 < D$ and $H1 > D/2 - (D^2/4 - W1^2/4)^{1/2}$, wherein W1 represents a width between the pair of side walls, H1 represents a height of the pair of side walls, and D represents a diameter of the optical isolator.

16. A semiconductor laser module for optically coupling light radiated from a semiconductor laser device to an optical fiber using a lens and an optical isolator, said module comprising:

a lens holder for holding the lens; and a single and common securing member configured to attach the lens holder together with the optical isolator thereon, the securing member comprising a channel element having a bottom plate and a pair of side walls formed on each side of the bottom plate, the pair of side walls positioning the lens holder and the optical isolator relative to each other, wherein the height of each side wall is different between the portion where the lens holder is secured and the portion where the optical isolator is secured.

* * * * *